Feb. 21, 1950 — S. BLOOMFIELD — 2,498,331
ICE CREAM DISHER
Filed Aug. 12, 1946 — 2 Sheets-Sheet 2
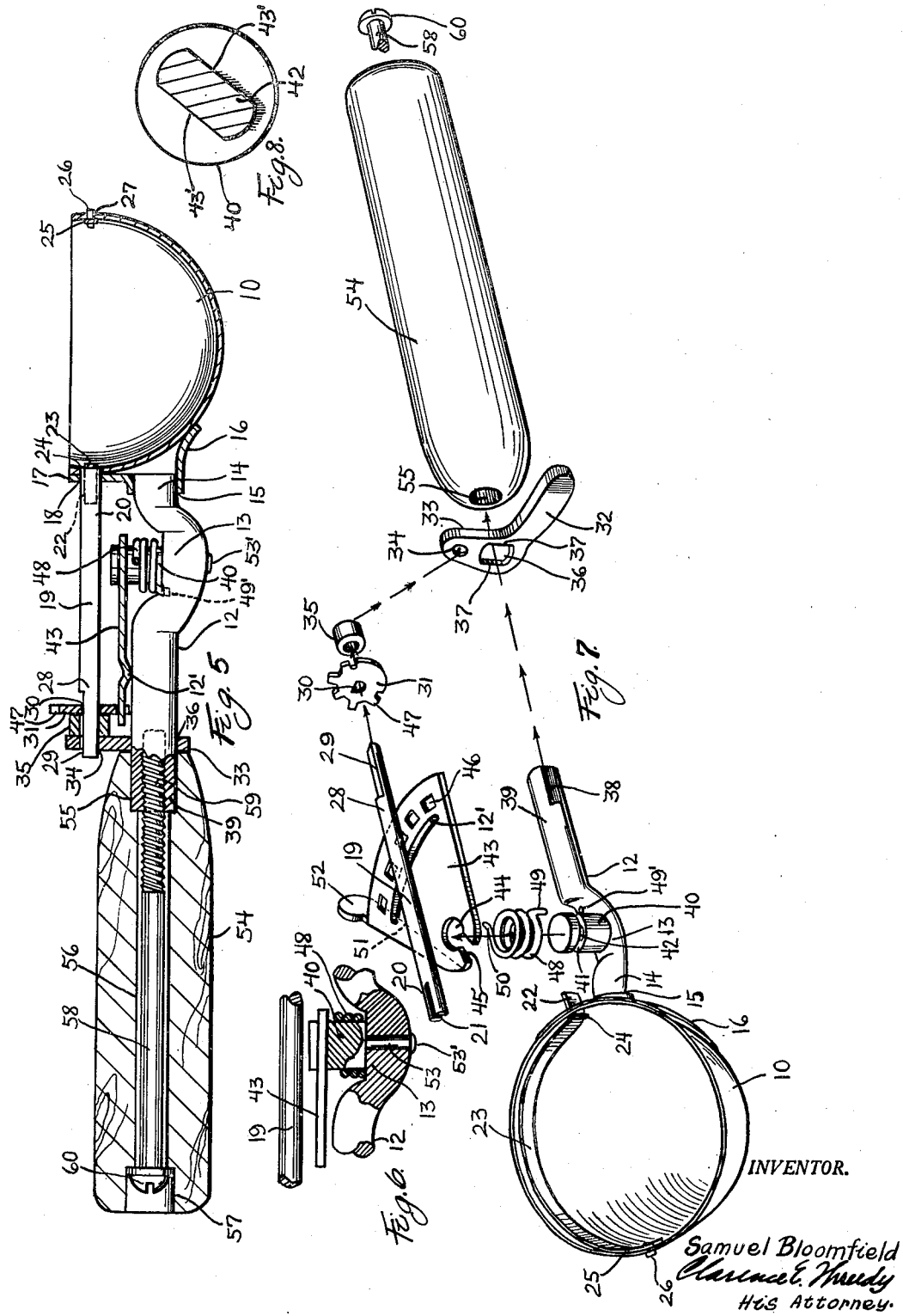
INVENTOR.
Samuel Bloomfield
Clarence E. Threedy
His Attorney.

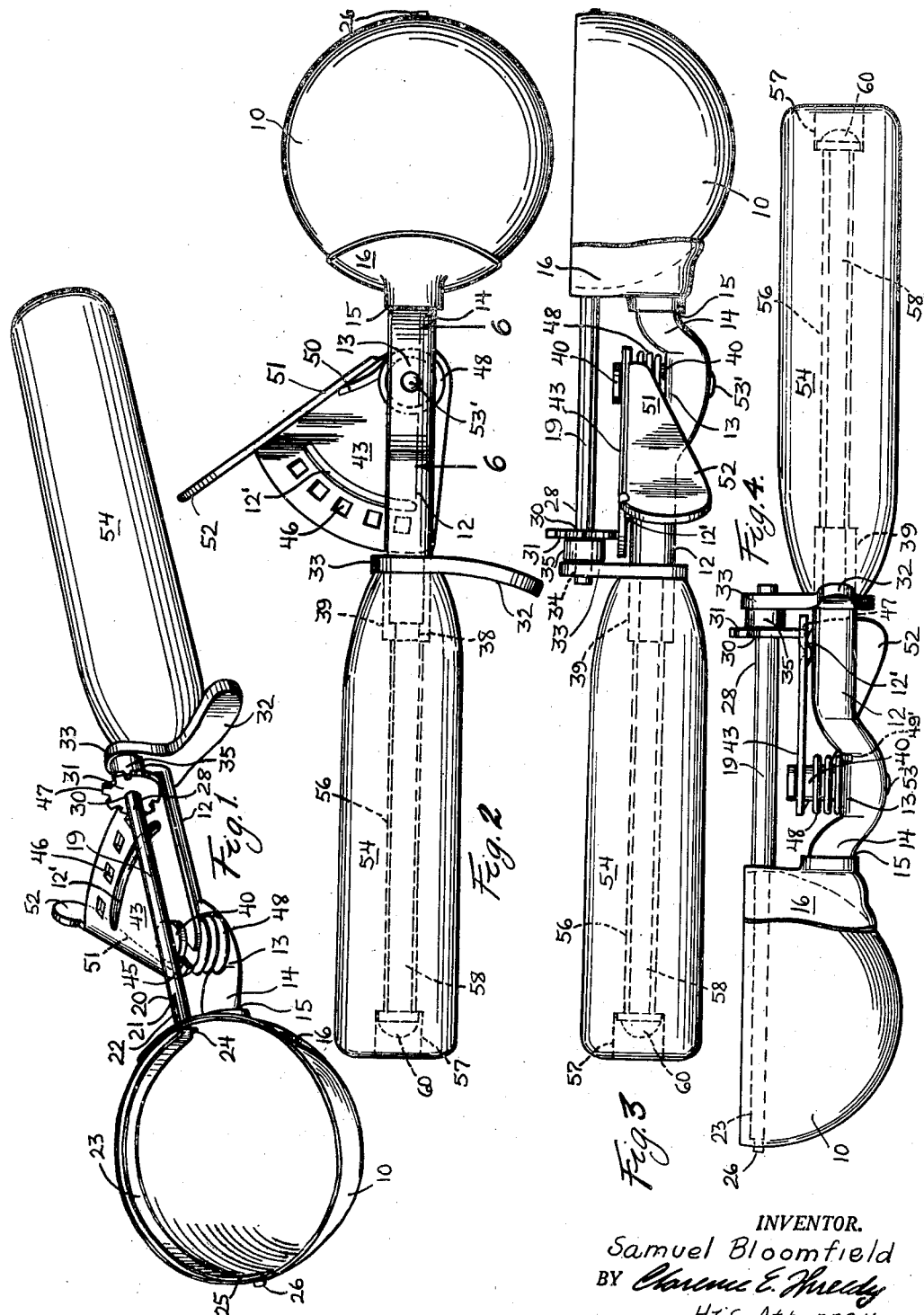

Patented Feb. 21, 1950

2,498,331

UNITED STATES PATENT OFFICE 2,498,331

ICE CREAM DISHER

Samuel Bloomfield, Chicago, Ill.

Application August 12, 1946, Serial No. 690,034

2 Claims. (Cl. 107—48)

This invention relates to new and useful improvements in ice cream dishers.

More particularly the invention relates to a utensil commonly known as an ice cream scoop for serving ice cream in a measured form from an ice cream container. As such the invention has as a principal object, the provision of an improved construction of this character, which will be highly efficient in use and economical in manufacture.

In accomplishing the object of providing a scoop of the character more fully hereinafter described, which may be manufactured at an economical cost, it is apparent that the several parts of the scoop should be related one to the other in a manner such that assembly of the parts may be done quickly and without the requirement of a skilled mechanic.

In the process of serving ice cream from an ice cream container by means of a scoop, it is a known fact that substantial force must be applied to the scoop in order to pass the scoop cup into the ice cream and to scoop the ice cream therein and then withdraw the scoop therefrom. Frequently, by reason of this undue force necessary for this operation, the scoop bends or is ruptured at the junction between the handle of the scoop and the cup. With this in mind, it is an object of this invention to provide a cup and a handle constructed in a manner such as will reduce to a minimum the possibility of breakage or bending of the handle.

Yet another and equally important object of the invention, is the provision of a scoop having a cup provided with a blade operable within the cup by mechanism which is substantially effective for that purpose and which may be operated with the minimum of effort on the part of the operator.

Other objects will appear hereinafter.

Fig. 1 is a perspective view of my improved ice cream disher.

Fig. 2 is a bottom plan view of the same.

Fig. 3 and Fig. 4 are side views respectively of the invention.

Fig. 5 is a longitudinal sectional detail view of the same.

Fig. 6 is a fragmentary sectional detail view taken substantially on line 6—6 of Fig. 2.

Fig. 7 is a perspective view of the invention showing the parts thereof in exploded relation and Fig. 8 is an enlarged sectional detail view of the ratchet plate mounting stud.

The several objects of my invention are accomplished by the preferred form of construction illustrated in the accompanying drawings.

In this connection, my improved ice cream disher includes a cup 10 within which operates a blade 23 of resilient material and preferably of relatively thin material inasmuch as the function of this blade is to sever the measured ice cream portion from the walls of the cup 10.

A shank 12, having a flattened medial portion 13, has an end portion 14 projected into a socket 15 formed in a plate 16. This plate 16 is secured by brazing or the like to the cup 10, and is shaped in its major portion to conform to the shape of the cup 10. The end portion 14 of the shank 12 is likewise secured in the socket 15 by welding or the like. In this manner, not only is the shank 12 securely connected to the cup 10 but the plate 16 substantially reinforces the point of connection between the shank 12 and the cup 10.

Formed in this plate 16, adjacent its top edge 17, is an opening 18 and projecting into this opening 18 is a rotatable shaft 19. The end 20 of this shaft 19 is bifurcated as at 21 to receive the angled end portion 22 of the wiper blade 23, the said end portion 22 projecting through an opening 24 formed in the cup 10. The end portion 25 of this blade 23, which blade 23 is formed of resilient material, carries a pin 26 which rotatably projects into an opening 27 formed in the cup 10.

By this structure, the wiper blade 23 is supported within the cup 10 for movement over the inner wall or surface thereof, to separate from such wall the measured portion of ice cream.

The end portion 28 of the shaft 19 has a flattened surface 29 and this portion 28 having the flat surface 29 projects through an opening 30 formed in a segment gear 31, the flattened portion 29 serving to fix the gear 31 upon the shaft 19 for rotation with the latter.

Mounted on the shank 12 is a finger piece 32 formed as an integral part of a plate 33. This plate 33 has an opening 34 formed therein into which projects the end 28 of the shaft 19. Between this plate 33 and the gear 31 is a spacer sleeve 35. The plate 33 has an opening 36 formed therein and this opening provides opposite flat edges 37 which, when the plate 33 is mounted on the shank 12, fits against the flat surfaces 38 formed on the end portion 39 of the shank 12.

On the swaged portion 13 of the shank 12 is a bearing stud 40 having a groove 41 around a core 42, Fig. 8, which core 42 is substantially circular in cross section except for opposite flat sides 43'. The stud 40 is positioned on the shank 12 in such a manner that the flat sides 43' of the core 42 are substantially perpendicular to the axis of the shank 12. A ratchet plate is indicated at 43 and this ratchet plate is provided with an opening 44 of a diameter to receive the core 42 and entrance to which is permitted by a slot 45 of a width substantially corresponding to the width of the core 42 between the flat sides 43'. The arrangement is such that by passing the core 42 through the slot 45, the core will be disposed in the opening 44 to provide oscillatory connection between the ratchet plate 43 and the bearing 40. The ratchet plate 43 is spaced from the shank 12 by a rib 12' which rides upon the shank 12, as shown in Fig. 5. The ratchet plate 43 is provided with spaced openings 46 adapted to have meshing relation with respect to the teeth 47 of the gear 31, the gear having an enlarged portion to limit rotation of the gear relative to the ratchet plate 43. The rib 12' maintains the ratchet 43 and teeth 47 in meshing engagement with respect to each other. It also serves to strengthen the ratchet plate.

A coil spring 48 is mounted upon the bearing 40 with one end portion 49 engaged in an opening 49' formed in the swaged portion 13 and an opposite end portion 50 bearing against a depending flange 51 provided by the plate 43. This flange 51 provides an extension which serves as a finger piece 52.

The coil spring 48 is related to the shank 12 and ratchet plate 43 in a manner such that when pressure is applied to the finger piece 52 of the plate 43, the gear 31 will be rotated by this spring to the position to dispose the blade 23 contiguous the edge of the cup 10, as shown in Fig. 7.

The bearing 40 is provided with a shank 53, riveted as at 53' to the swaged portion 13.

To complete the invention a handle 54 is provided. This handle 54 has a socket 55, into which projects the end 39 of the shank 12. A longitudinally extending bore 56 is formed in the handle 54, the outer end of which, as at 57, is of a larger diameter than the remaining portion of the bore. In this bore is positioned a connecting bolt 58 threaded as at 59 into the shank 12 with the head 60 disposed in the enlarged bore portion 57.

When the parts are assembled in the manner shown in Figures 1 to 5 inclusive, the ice cream disher is used in the following manner:

The handle 54 is firmly held in the hand with the thumb engaging the finger piece 32 and the index finger disposed to bear upon the finger piece 52. By applying pressure of the index finger on the finger piece 52, after a portion of ice cream has been scooped into the cup 10, the ratchet 43 will be rotated to impart rotation through the gear 31 to the shaft 19, which in turn will rotate the blade 23 over the inner surface of the cup 10. By this simple operation, a measured portion of ice cream may be scooped from an ice cream container and subsequently dislodged from the cup.

One of the principal objects of the invention, as before stated, is in the method of assembling the ice cream disher. This affords economical manufacture and may be done by one other than a skilled mechanic.

This method of assembly is clearly illustrated in the exploded view, Fig. 7, and is accomplished in the following manner:

First, the blade 23 is mounted with the pin 26 in the opening 27 and with the angled end portion 22 projecting through the opening 24.

The spring 48 is now mounted in position upon the bearing 40. The ratchet plate 43 is then mounted on the bearing stud 40 by sliding the slot 45 past the flat sides 43' of the core 42 so that the opening 44 engages the core 42 of the bearing stud 40, and then rotating the ratchet plate 43 approximately 90° to operative position. While in operative position the ratchet plate 43 cannot become disengaged from the bearing stud 40 because of the fact that the flat sides 43' of the core 42 are substantially perpendicular to the axis of the shank 12. Next the shaft 19 is mounted in position with the angled end portion 22 of the blade 23 projecting into the bifurcated end 20. The gear 31 is now positioned on the flattened end 29 of the shaft with a tooth 47 thereof engaging in one of the openings 46. The spacing sleeve 35 is now mounted on the shaft 19, after which the flattened end portion 29 of this shaft is projected into the opening 34 of the plate 33 and the end portion 39 of the shank 12 is projected through the opening 36 of the plate 33. The handle is now mounted on the shank 12 by inserting the end portion 39 of the latter into the socket 55. Then, to complete the assembly, the bolt 58 is threaded into the shank 12. From this it will be seen that a single bolt, to-wit, the bolt 58, serves to connect the several parts in assembled relation with respect to each other.

Should occasion require the replacement of the blade 23 or, for example, the replacement of the ratchet plate 43 or spring 48, the method of assembly hereinbefore described permits these parts to be disassembled without the necessity of the use of tools or the removal of the handle 54, and this is accomplished in the following manner:

To disassemble these parts, the blade 23, being of resilient material, may be flexed to permit withdrawal of the extension 22 from the bifurcated slot 21 of the shaft 28, whereupon this shaft 28 may be withdrawn from the opening 30 of the gear 31, after which the gear 31 may be disengaged from the ratchet plate 43 permitting the ratchet plate 43 to be removed from the mounting stud 40, thus exposing the spring 48 for removal from the stud 40. In this disassembly of the parts, it will be apparent that no tool or other instrument was required.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. An ice cream disher comprising a shank, a handle at one end of said shank, a cup on said shank, a plate placed on said cup and providing a socket into which the opposite end portion of the shank is projected, a blade operable within said cup, and means on said shank for rotating said blade relative to said cup, said means including a ratchet plate provided with an opening and an entrance slot leading to said opening, a segmental gear meshing with said ratchet plate, a shaft carrying the gear and having an end portion connected to the blade, a mounting stud on the shank and having a reduced core portion substantially circular in cross section with the exception of two oppositely disposed flat sides, the distance between which is equivalent to the width of the entrance slot and the diameter of said core being of a diameter to be received in said opening, and said flat sides being disposed perpendicular to the axis of said shank so that the said ratchet plate cannot become disengaged while in operative position, a coil spring on said mounting stud with one end portion connected to said ratchet plate and an opposite end portion connected to the shank.

2. An ice cream disher comprising a shank, a handle at one end of said shank, a cup on the other end of said shank, a blade operable with said cup, and means on said shank for rotating said blade relative to said cup, said means including a ratchet plate provided with an opening and an entrance slot leading to said opening, a segmental gear meshing with said ratchet plate, a shaft carrying the gear and having an end portion connected to the blade, a mounting stud on the shank and having a reduced core portion substantially circular in cross section with the exception of two oppositely disposed flat sides the distance between which is equivalent to the width of the entrance slot and the diameter of said core being of a diameter to be received in said opening, said flat sides being disposed substantially perpendicular to the axis of said shank so that said ratchet plate cannot become disengaged while in operative position, and a coil spring on said mounting stud with one end portion connected to said ratchet plate and an opposite end portion connected to the shank.

SAMUEL BLOOMFIELD.

REFERENCES CITED

The following references are of record in the file of this patent:

UNITED STATES PATENTS

| Number | Name | Date |
|---|---|---|
| 1,496,466 | Jackson | June 3, 1924 |
| 1,728,505 | Palmer | Sept. 17, 1929 |
| 1,789,065 | Brezin | Jan. 13, 1931 |
| 1,789,588 | Jameson | Jan. 20, 1931 |
| 1,826,818 | Palmer | Oct. 13, 1931 |
| 1,857,685 | Friedman | May 10, 1932 |
| 2,041,200 | Myers | May 19, 1936 |
| 2,155,700 | Donahue | Apr. 25, 1939 |
| 2,333,732 | Morris | Nov. 9, 1943 |